US012656475B2

(12) United States Patent (10) Patent No.: US 12,656,475 B2
Walker et al. (45) Date of Patent: Jun. 16, 2026

(54) SYSTEM AND METHOD OF OPERATION FOR NEAR FIELD AUXILIARY RADAR

(71) Applicant: Applied Concepts, Inc., Richardson, TX (US)

(72) Inventors: Stanley A. Walker, Flower Mound, TX (US); John L. Aker, Richardson, TX (US)

(73) Assignee: APPLIED CONCEPTS, INC., Richardson, TX (US)

( * ) Notice: Subject to any disclaimer, the term of this patent is extended or adjusted under 35 U.S.C. 154(b) by 0 days.

(21) Appl. No.: 18/338,419

(22) Filed: Jun. 21, 2023

(65) Prior Publication Data

US 2024/0427002 A1 Dec. 26, 2024

(51) Int. Cl.
G01S 13/60 (2006.01)

(52) U.S. Cl.
CPC .................................... G01S 13/60 (2013.01)

(58) Field of Classification Search
CPC ....... G01S 2013/932; G01S 2013/9319; G01S 13/931; G01S 13/58; G01S 13/60
USPC ..................................................... 372/70, 104
See application file for complete search history.

(56) References Cited

U.S. PATENT DOCUMENTS

| | | | | |
|---|---|---|---|---|
| 4,145,692 | A | 3/1979 | Armstrong et al. | |
| 4,249,174 | A | 2/1981 | Lucchi et al. | |
| 5,061,932 | A * | 10/1991 | Tribe ................... | B60G 17/019 |
| | | | | 73/105 |

| | | | | |
|---|---|---|---|---|
| 6,349,246 | B1 * | 2/2002 | Smith .................... | G01C 21/34 |
| | | | | 701/1 |
| 6,498,582 | B1 | 12/2002 | Sweeney et al. | |
| 6,621,447 | B2 * | 9/2003 | Park ........................ | G01S 7/022 |
| | | | | 342/70 |
| 6,819,285 | B1 | 11/2004 | Stockman et al. | |
| 7,218,271 | B2 * | 5/2007 | Aker ....................... | G01S 7/064 |
| | | | | 342/115 |
| 7,573,420 | B2 | 8/2009 | Forstner et al. | |
| 8,957,807 | B2 * | 2/2015 | Mills ..................... | G01S 7/4026 |
| | | | | 342/174 |
| 8,965,677 | B2 * | 2/2015 | Breed .................... | G08G 1/163 |
| | | | | 701/301 |
| 8,983,771 | B2 * | 3/2015 | Breed .................... | G08G 1/166 |
| | | | | 701/423 |
| 9,176,224 | B2 * | 11/2015 | Kavaler ................. | G01S 7/003 |
| 9,315,150 | B2 * | 4/2016 | Rashid ................... | B60Q 9/008 |
| 9,373,202 | B2 * | 6/2016 | Shimizu ................ | G07C 5/085 |
| 9,645,250 | B2 * | 5/2017 | Zeng ...................... | G01S 19/42 |
| 9,778,357 | B2 | 10/2017 | Zhang et al. | |
| 9,989,637 | B2 * | 6/2018 | Rashid ................... | G08G 1/166 |
| 10,051,347 | B2 * | 8/2018 | Hollis ...................... | H04Q 9/00 |

(Continued)

FOREIGN PATENT DOCUMENTS

WO WO-2023133450 A1 * 7/2023 ............. B60R 11/00

*Primary Examiner* — Michael W Justice

(74) *Attorney, Agent, or Firm* — Jackson Walker LLP; Christopher J. Rourk

(57) ABSTRACT

A system for detecting a vehicle speed, comprising an exterior housing configured to be secured to an exterior surface of a vehicle. A Doppler radar unit contained within the exterior housing and configured to detect a relative speed of a road surface. A wireless transceiver contained within the exterior housing and coupled to the Doppler radar unit, the wireless transceiver configured to transmit data representing the relative speed of the road surface to a system inside of the vehicle that includes a display.

20 Claims, 2 Drawing Sheets

(56) References Cited

U.S. PATENT DOCUMENTS

| | | | |
|---|---|---|---|
| 10,108,892 B2* | 10/2018 | Sengstaken, Jr. | A61J 7/04 |
| 10,150,416 B2* | 12/2018 | Masckauchan | B60Q 1/2615 |
| 10,211,531 B2 | 2/2019 | Galejs | |
| 10,527,722 B2* | 1/2020 | Carlson | B62J 50/225 |
| 10,670,699 B2* | 6/2020 | Schat | G01S 13/584 |
| 10,688,950 B2* | 6/2020 | Harada | B60R 21/0134 |
| 10,823,844 B2* | 11/2020 | Arndt | G01S 13/878 |
| 10,955,524 B2* | 3/2021 | Crane | G01S 13/5246 |
| 10,958,295 B2 | 3/2021 | Peng et al. | |
| 10,989,802 B2* | 4/2021 | Pos | G01S 13/882 |
| 11,486,994 B2* | 11/2022 | Kishigami | G01S 7/4026 |
| 11,789,144 B2* | 10/2023 | Leßmann | G01S 13/931 |
| | | | 342/70 |
| 11,852,714 B2* | 12/2023 | Helwa | G01S 13/931 |
| 11,940,524 B2* | 3/2024 | Kishigami | G01S 13/42 |
| 12,038,492 B2* | 7/2024 | Woo | G01S 7/2923 |
| 2003/0128148 A1* | 7/2003 | Park | G01S 7/022 |
| | | | 340/901 |
| 2005/0062642 A1* | 3/2005 | Aker | G01S 13/52 |
| | | | 342/115 |
| 2008/0211668 A1* | 9/2008 | Dixon | G08B 29/188 |
| | | | 340/541 |
| 2008/0278370 A1 | 11/2008 | Lachner et al. | |
| 2011/0221624 A1* | 9/2011 | Kavaler | G08G 1/02 |
| | | | 342/22 |
| 2012/0323474 A1* | 12/2012 | Breed | G08G 1/161 |
| | | | 701/117 |
| 2013/0154870 A1* | 6/2013 | Mills | G01S 7/4026 |
| | | | 342/174 |

| | | | |
|---|---|---|---|
| 2014/0035737 A1* | 2/2014 | Rashid | B60Q 9/008 |
| | | | 340/435 |
| 2014/0118180 A1* | 5/2014 | Kavaler | G08G 1/02 |
| | | | 342/27 |
| 2014/0195070 A1* | 7/2014 | Shimizu | B60W 30/095 |
| | | | 701/1 |
| 2014/0210644 A1* | 7/2014 | Breed | B60W 30/16 |
| | | | 340/905 |
| 2016/0082885 A1* | 3/2016 | Rashid | G01S 13/58 |
| | | | 340/435 |
| 2016/0165323 A1* | 6/2016 | Hollis | H04Q 9/00 |
| | | | 340/870.16 |
| 2016/0170021 A1* | 6/2016 | Rashid | G01S 13/931 |
| | | | 342/70 |
| 2016/0299234 A1* | 10/2016 | Zeng | G01S 19/42 |
| 2016/0363665 A1* | 12/2016 | Carlson | B62J 50/225 |
| 2018/0075330 A1* | 3/2018 | Sengstaken, Jr. | G06K 19/0723 |
| 2018/0143295 A1* | 5/2018 | Crane | G01S 7/415 |
| 2018/0272947 A1* | 9/2018 | Masckauchan | B60R 1/06 |
| 2018/0299545 A1* | 10/2018 | Arndt | G01S 13/867 |
| 2018/0361973 A1* | 12/2018 | Harada | B60R 21/0134 |
| 2019/0072647 A1* | 3/2019 | Schat | G01S 7/354 |
| 2020/0189459 A1* | 6/2020 | Bush | G06V 20/597 |
| 2021/0048522 A1* | 2/2021 | Pos | G01S 13/882 |
| 2021/0173071 A1* | 6/2021 | Helwa | G01S 13/931 |
| 2022/0026558 A1* | 1/2022 | Quinn | G01S 13/605 |
| 2022/0066015 A1* | 3/2022 | Burghardt | G01S 13/582 |
| 2022/0075051 A1* | 3/2022 | Woo | G01S 7/415 |
| 2022/0194582 A1 | 6/2022 | Rios | |
| 2023/0184932 A1* | 6/2023 | Leßmann | G01S 13/52 |
| | | | 342/70 |
| 2023/0213341 A1* | 7/2023 | Dickinson | G01C 21/1652 |
| | | | 342/61 |

* cited by examiner

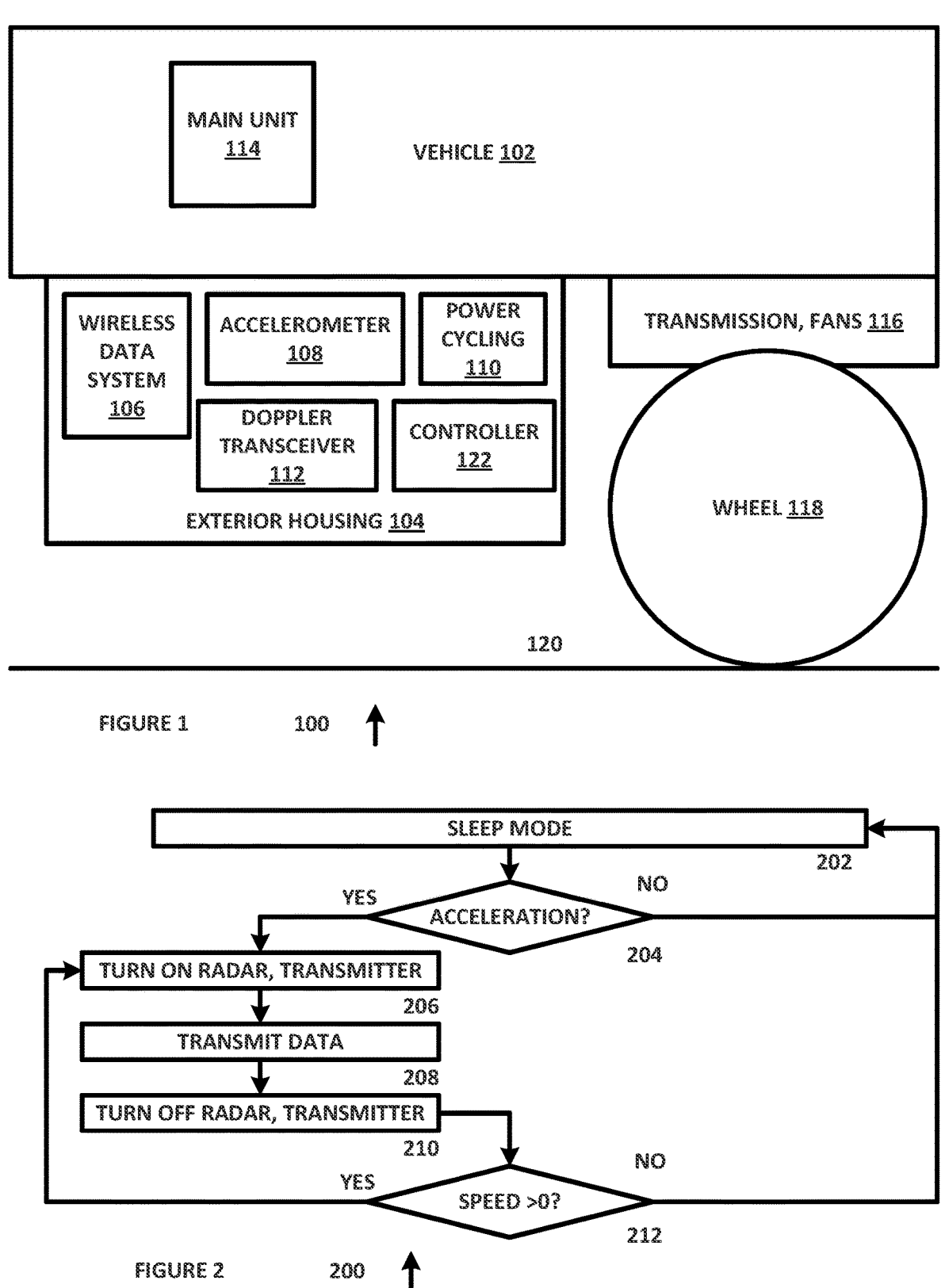
FIGURE 1          100
FIGURE 2          200

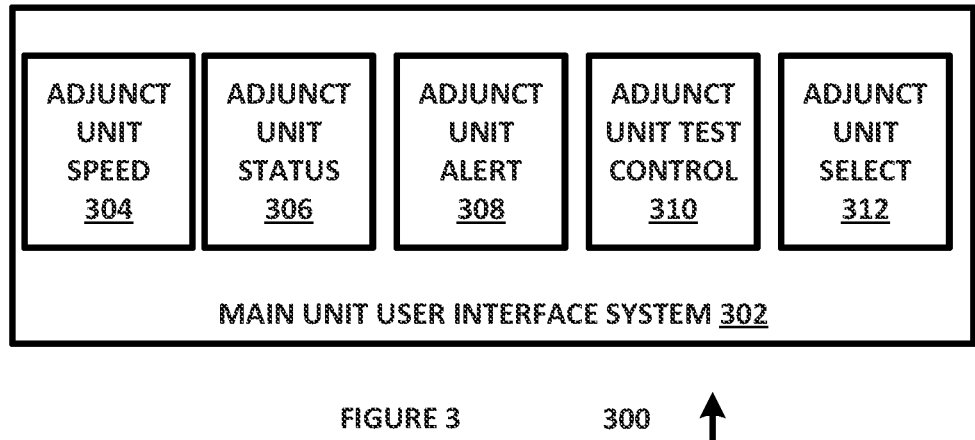
FIGURE 3                    300
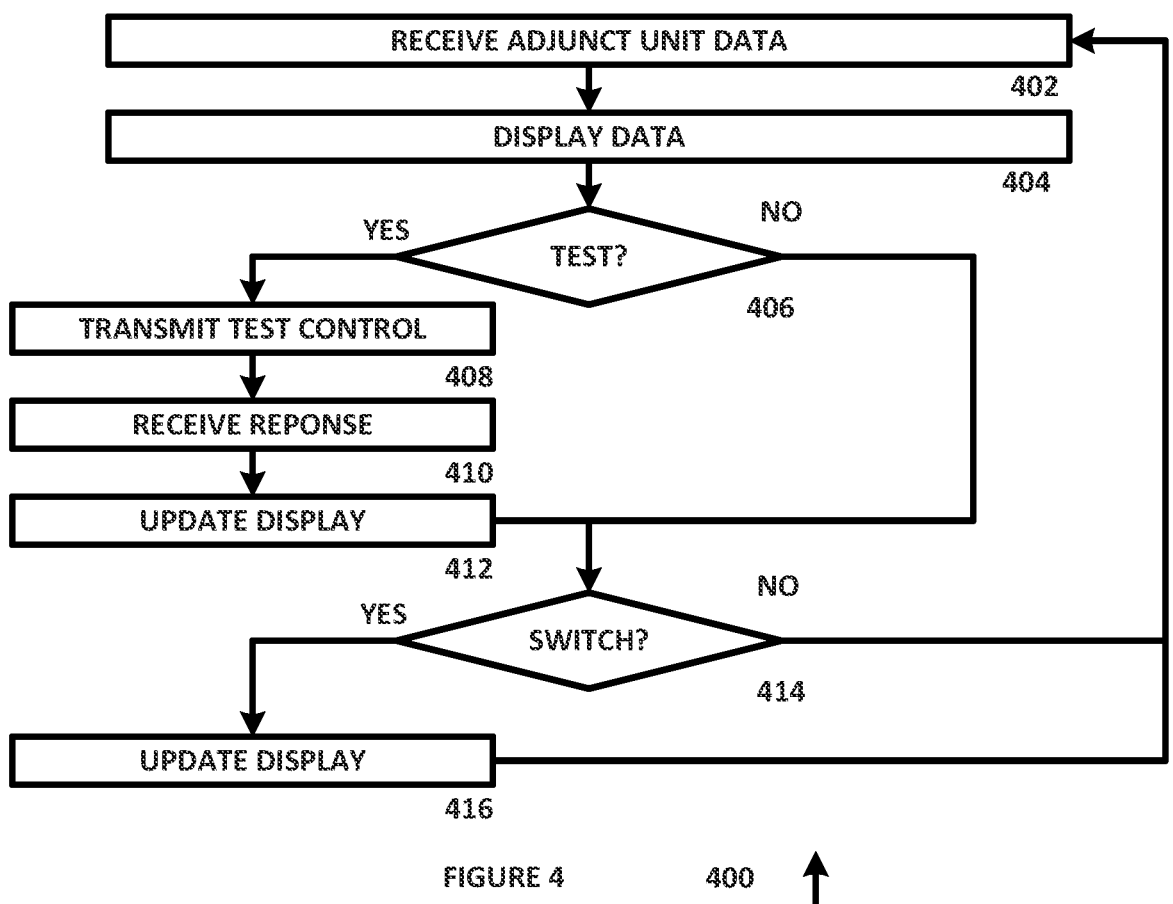
FIGURE 4                    400

SYSTEM AND METHOD OF OPERATION FOR NEAR FIELD AUXILIARY RADAR

TECHNICAL FIELD

The present disclosure relates generally to radar systems, and more specifically to a system and method of operation for near field auxiliary radar.

BACKGROUND OF THE INVENTION

Speed detection radar systems that are used to detect the speed of other vehicles can also detect the speed of the vehicle that they are installed in, but noise and other operational limitations limits that capability.

SUMMARY OF THE INVENTION

A system for detecting a vehicle speed is disclosed that includes an exterior housing configured to be secured to an exterior surface of a vehicle, such as by attaching the exterior housing to a vehicle undercarriage. A Doppler radar unit contained within the exterior housing is configured to detect a relative speed of a road surface. A wireless transceiver is contained within the exterior housing and transmits data representing the relative speed of the road surface to a system inside of the vehicle that includes a display, such as a main radar speed detection system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of an external adjunct radar system, in accordance with an example embodiment of the present disclosure;

FIG. 2 is a diagram of an algorithm for controlling an adjunct radar system, in accordance with an example embodiment of the present disclosure;

FIG. 3 is a diagram of a system for providing a user interface for adjunct wireless systems for a radar system, in accordance with an example embodiment of the present disclosure; and FIG. 4 is a diagram of an algorithm for interacting with adjunct wireless systems from a main radar system, in accordance with an example embodiment of the present disclosure.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

FIG. 1 is a diagram of a system 100 for providing an external adjunct radar, in accordance with an example embodiment of the present disclosure. System 100 includes vehicle 102, exterior housing 104, wireless data system 106, accelerometer 108, power cycling 110, Doppler transceiver 112, main unit 114, transmission and fans 116, wheel 118, road surface 120 and controller 122, and can be implemented in hardware or for the indicated components discussed below, a suitable combination of hardware and software.

Vehicle 102 can be an automobile, a sports-utility vehicle or other suitable vehicles, such as vehicles that are used to patrol for speeding violations. In one example embodiment, vehicle 102 can be provided without exterior housing 104 and its contents or main unit 114, and those components can be retrofitted onto vehicle 102, or other suitable embodiments can also or alternatively be used.

Exterior housing 104 can be formed from impact-resistant plastic, metal or other suitable materials and can be configured to contain an adjunct radar speed detection system and to be installed and mounted underneath vehicle 102, such as by attachment to a structural frame component of vehicle 102 or in other suitable manners. In one example embodiment, exterior housing 104 can include one or more ports to allow Doppler transceivers 112 to be positioned for direction towards road surface 120, wheel 118, transmission and fans 116 or other suitable structures or components. Exterior housing 104 can be configured to be wear resistant and weather resistant to improve its durability in the harsh undercarriage environment, and can include a seal or conformable gasket to form a barrier between the ambient environment and the interior of exterior housing 104. The internal components of exterior housing 104 can likewise be hardened to resist environmental exposure, such as by enclosing one or more of the components in separate protective enclosures, by using heavy duty connectors between components or in other suitable manners.

Wireless data system 106 can be implemented in hardware or a suitable combination of hardware and software, and is configured to receive data from accelerometer 108, power cycling 110, Doppler transceiver 112 and other components of an adjunct radar system and to transmit the data to main unit 114, or to receive data from main unit 114 for use by the adjunct radar system. In one example embodiment, wireless data system 106 can be implemented using a Bluetooth-compatible system or component, a Wi-Fi compatible system or component, or other suitable systems or components.

Accelerometer 108 can be implemented in hardware or a suitable combination of hardware and software, and is configured to detect acceleration or deceleration of vehicle 102 and to generate associated data for processing by controller 122 or other suitable components. In one example embodiment, accelerometer 108 can be implemented using a capacitive microelectrical mechanical system (MEMS) device, a piezoresistive device, a piezoelectric device or other suitable devices.

Power cycling 110 can be implemented in hardware or a suitable combination of hardware and software, and is configured to be activated by accelerometer 108, Doppler transceiver 112, controller 122 or by other suitable systems or components. In one example embodiment, power cycling 110 can include a battery, a piezoelectric charging device, an inertial energy scavenging device, a wireless energy receiver or other suitable systems and components that can be used to charge the battery, and can be configured to cycle power to wireless data system 106, accelerometer 108, Doppler transceiver 112, controller 122 or other suitable systems or components, such as by generating suitable on/off controls, by providing or interrupting power or in other suitable manners.

Doppler transceiver 112 can be implemented in hardware or a suitable combination of hardware and software, and is configured to turn on when accelerating and to generate speed data for a speed of a road surface relative to vehicle 102 by transmitting radar frequency electromagnetic energy and receiving and processing reflected signals. In one example embodiment, Doppler transceiver 112 can be configured to automatically transmit speed data to controller 122, wireless data system 106 or other suitable systems or components, and to cycle and turn off in response to receiving a signal from power cycling 110, controller 122 or other suitable systems. In another example embodiment, Doppler transceiver 112 can be implemented as a plurality of 2D transceiver modules that can be electronically controlled to change direction, such as a phased array or other suitable configurations.

Main unit 114 can be implemented in hardware or a suitable combination of hardware and software, and is configured to generate radar signals for speed detection of other vehicles. Main unit can also detect a speed of vehicle 102, but that speed can be obscured for a number of reasons, such that the adjunct radar unit in exterior housing 104 can provide a more sensitive and accurate estimate of the vehicle speed. Main unit 114 can also interface with the adjunct radar system in exterior housing 104 to receive vehicle speed data and other suitable data. In one example embodiment, main unit 114 can include a display that shows a vehicle speed that is based on data from the adjunct radar system, such as by displaying the speed data determined by controller 122, by determining speed data as a function of data received from Doppler transceiver 112, or in other suitable manners.

Transmission and fans 116 and wheel 118 are representative of common vehicle components that Doppler transceiver 112 is able to detect, in addition to road surface 120. While one objective of Doppler transceiver 112 is to determine a vehicle speed independent of any radar signals generated by main unit 114, it may also or alternatively be used to detect whether transmission and fans 116 and wheel 118 are operational, such as to determine if the vehicle is operational and moving, or for other suitable purposes. In this example embodiment, a plurality of Doppler transceivers 112 can be provided, a servo motor can be used to change the direction of Doppler transceiver 112 or other suitable configurations can also or alternatively be used.

Road surface 120 can be detected by Doppler transceiver 112, and used to determine a speed of vehicle 102. Because Doppler transceiver 112 of the adjunct radar unit can be optimized for detecting a vehicle speed relative to road surface 120 from reflections of radar frequency signals from road surface 120, it can be optimized for that application and can have a lower cost, lower power requirements and other features that facilitate implementation. For example, vehicle speeds fall within a range that is narrower than speeds of approaching or receding vehicles, and a radar system that is configured to detect the speeds of other vehicles must be capable of discriminating between frequency components of different vehicles in the reflected radar signal, which imposes tracking and filtering requirements that are not needed for Doppler transceiver 112. As such, Doppler transceiver 112 does not need to buffer sequential speed data and to track multiple peaks of different frequency components, and can instead be optimized to detect a single strongest frequency component from the reflected radar signal. Doppler transceiver 112 can also be power cycled without impacting its functionality, unlike speed detection radar systems that must operate continuously after calibration for evidentiary purposes.

Controller 122 can be implemented in hardware or a suitable combination of hardware and software, and is configured to interface with wireless data system 106, accelerometer 108, power cycling 110, Doppler transceiver 112 and other components of an adjunct radar unit, as well as with main unit 114. Controller 122 can be further configured to control the operation of one or more components of the adjunct radar unit, to process data received from those components, to implement operational controls and for other suitable functions.

In operation, system 100 determines an accurate road speed, can identify radar noise sources, and can improve the operation of the main radar speed detection unit. System 100 thus improves the operation of the main radar speed detection unit and provides additional benefits, such as a vehicle speed determination that does not require an input from the vehicle.

FIG. 2 is a diagram of an algorithm 200 for controlling an adjunct radar system, in accordance with an example embodiment of the present disclosure. Algorithm 200 can be implemented in hardware or a suitable combination of hardware and software.

Algorithm 200 begins at 202, where the adjunct radar system is in sleep mode until acceleration is detected. In one example embodiment, an accelerometer can remain operational during sleep mode to detect acceleration, a motion-activated switch can be used to start the accelerometer if it is shut down or other suitable processes can also or alternatively be used. The algorithm then proceeds to 204.

At 204, it is determined whether acceleration has been detected by the accelerometer. If no acceleration is detected, the algorithm returns to 202, otherwise the algorithm proceeds to 206.

At 206, a power cycling system is initiated and provides power to a Doppler transceiver, a wireless data system, a controller and other suitable system components. In one example embodiment, the power cycling system can include a battery having a fixed charge, a rechargeable battery, a battery coupled to an inertial energy scavenger or other suitable power sources. The algorithm then proceeds to 208.

At 208, a Doppler transceiver generates speed data, which is formatted for transmission and transmitted by a wireless data transmission system. In one example embodiment, processing of radar data can be performed by a data processor at a main unit, such that the data from Doppler transceiver that is transmitted to the main unit is a subset of the data that would normally be processed, such as a strongest frequency component. In this manner, the data processing requirements at the adjunct radar unit can be optimized for lower power than the data processing requirements at the main unit. The algorithm then proceeds to 210.

At 210, a power cycling unit turns off the Doppler transceiver, the wireless data transmitter, the controller and other suitable components. In one example embodiment, the power cycling unit can provide electrical energy to a system bus for a predetermined period of time that is sufficient to allow the Doppler transceiver, the wireless data transmitter, the controller and other system components to turn on and perform the functions needed to generate speed data and other associated functions. The algorithm then proceeds to 212.

At 212, it is determined whether the detected vehicle speed is greater than zero. In one example embodiment, the speed determination can be based on the last set of radar data generated by the Doppler transceiver, on accelerometer data, on data received from the main unit or other suitable data. If it is determined that the speed is greater than zero, then the algorithm returns to 206, otherwise the algorithm returns to 202.

In operation, algorithm 200 allows an adjunct Doppler speed detector to be used to determine road speed, independent of any signal received from the vehicle. While algorithm 200 is shown as a flow chart, a person of skill in the art will recognize that it can also or alternatively be implemented using object-oriented programing, as a state diagram, as a ladder diagram, or in other suitable manners.

FIG. 3 is a diagram of a system 300 for providing a user interface for adjunct wireless systems for a radar system, in accordance with an example embodiment of the present disclosure. System 300 includes main unit user interface system 302, adjunct unit speed 304, adjunct unit status 306, adjunct unit alert 308, adjunct unit test control 310 and adjunct unit select 312, each of which can be implemented in hardware or a suitable combination of hardware and software.

Main unit user interface system 302 can be implemented as one or more algorithms operating on a user interface processor of a main radar speed detection unit that are loaded into a working memory of the processor to cause the processor to generate user interface controls and displays for adjunct units, such as an adjunct vehicle speed detection unit or other suitable units. A touch screen interface, a thin client user interface, a web browser user interface or other suitable user interfaces can be used, in addition to fixed user interfaces such as LED displays. Main unit user interface system 302 is thus configured to utilize the processing and data communications systems of the main unit to interact with the adjunct unit, as discussed and described further herein.

Adjunct unit speed 304 can be implemented as one or more algorithms operating on a user interface processor of a main radar speed detection unit that are loaded into a working memory of the processor to cause the processor to generate commands to receive and process speed data for the adjunct unit. In one example embodiment, the speed data can be a relative road speed, or other speed data can also or alternatively be used.

Adjunct unit status 306 can be implemented as one or more algorithms operating on a user interface processor of a main radar speed detection unit that are loaded into a working memory of the processor to cause the processor to generate commands to receive and process status data for the adjunct unit. In one example embodiment, the status data can be reduced to one of two status indicators, such as a first status indicator that the adjunct unit is operational and a second status indicator that the adjunct unit requires additional attention. Likewise, other status indicators can also or alternatively be used.

Adjunct unit alert 308 can be implemented as one or more algorithms operating on a user interface processor of a main radar speed detection unit that are loaded into a working memory of the processor to cause the processor to generate alerts for an adjunct unit. In one example embodiment, adjunct unit alert 308 can be activated by a user in response to a status indication that an adjunct unit requires additional attention, and can allow a user to scroll through alerts or to take other suitable actions to interface with the adjunct unit using the data communications systems and processing systems of the main unit.

Adjunct unit test control 310 can be implemented as one or more algorithms operating on a user interface processor of a main radar speed detection unit that are loaded into a working memory of the processor to cause the processor to initiate tests for an adjunct unit. In one example embodiment, adjunct unit test control 310 can be activated by a user in response to a status indication that an adjunct unit requires additional attention, and can allow a user to scroll through available tests or to take other suitable actions to interface with the adjunct unit to initiate a test using the data communications systems and processing systems of the main unit. For example, the tests can include a battery charge test, a battery discharge test, a temperature test, a radar signal strength test, a data communications test or other suitable tests.

Adjunct unit select 312 can be implemented as one or more algorithms operating on a user interface processor of a main radar speed detection unit that are loaded into a working memory of the processor to cause the processor to generate a user selection screen to select one of two or more adjunct units. In one example embodiment, a main unit can interface with two or more adjunct units, and a user can select one of the adjunct units to allow the wireless data communications, control and other suitable systems of the main unit to be reconfigured to interact with the selected unit.

In operation, system 300 allows a main radar speed detection unit to wirelessly interoperate with adjunct units, to avoid the need for a physical connection between the main unit and the adjunct unit. System 300 creates a combined system between the main unit and the adjunct unit to perform predetermined functions.

FIG. 4 is a diagram of an algorithm 400 for interacting with adjunct wireless systems from a main radar system, in accordance with an example embodiment of the present disclosure. Algorithm 400 can be implemented in hardware or a suitable combination of hardware and software.

Algorithm 400 begins at 402, where adjunct unit data is received at a main unit. In one example embodiment, a wireless data transceiver of the main unit can be configured to listen for messages from an adjunct unit, the main unit can be configured to poll the adjunct unit or other suitable processes can also or alternatively be used. The algorithm proceeds to 404.

At 404, data from the main unit and the adjunct unit is displayed. In one example embodiment, the main unit data that is displayed can be selected as a function of the adjunct unit data, such as when the detected speed of a target vehicle is adjusted to reflect a speed of the patrol vehicle as measured by the adjunct unit. In this example embodiment, the adjunct unit and main unit are controlled to selectively form a combined system, that provides augmented functions that are not available in either of the individual systems. Other suitable functions can also or alternatively be combined, as discussed and described further herein. The algorithm then proceeds to 406.

At 406, it is determined whether a test of the adjunct unit is required. In one example embodiment, a test may be required when there is a discrepancy between the adjunct unit data and the main unit data, at predetermined periods or at other suitable intervals. If it is determined that a test is not needed, the algorithm proceeds to 414, otherwise the algorithm proceeds to 408.

At 408, a test control signal is generated and transmitted to an adjunct unit from the main unit. In one example embodiment, the test control signal can be dynamically generated as a function of a user interface selection, can be selected as a function of the adjunct unit or other suitable processes can also or alternatively be used. The algorithm then proceeds to 410.

At 410, a response is received from the adjunct unit. In one example embodiment, the response can include test result data, speed data, battery status data, system condition data or other suitable data. The algorithm then proceeds to 412.

At 412, the display is updated. In one example embodiment, the display can be updated to include one or more action controls, an alert can be generated or other suitable display updates can be generated. The algorithm then proceeds to 414.

At 414, it is determined whether a control has been received to switch between adjunct units. In one example embodiment, the control can be generated in response to test data, can be periodically generated, can include a pull-down menu to select between adjunct units or other suitable controls can also or alternatively be used. If it is determined that a control has been generated, the algorithm proceeds to 416 and the display is updated to include data from the selected adjunct unit. Afterwards the algorithm returns to 402. Otherwise, the algorithm returns to 402.

In operation, algorithm 400 allows a main radar unit to interface with an adjunct unit to create a combined system and to perform one or more predetermined functions using the combined system. While algorithm 400 is shown as a flow chart, a person of skill in the art will recognize that it can also or alternatively be implemented using object-oriented programing, as a state diagram, as a ladder diagram, or in other suitable manners.

A system for detecting a vehicle speed is disclosed that includes an exterior housing configured to be secured to an exterior surface of a vehicle, a Doppler radar unit contained within the exterior housing and configured to detect a relative speed of a road surface and a wireless transceiver contained within the exterior housing and coupled to the Doppler radar unit, the wireless transceiver configured to transmit data representing the relative speed of the road surface to a system inside of the vehicle that includes a display.

The system can further include an accelerometer coupled to the Doppler radar unit and the wireless transceiver and configured to cause the Doppler radar unit and the wireless transceiver to be activated.

The system can further include an accelerometer and a power cycling system coupled to the accelerometer, the Doppler radar unit and the wireless transceiver and configured to cause the Doppler radar unit and the wireless transceiver to be activated in response to a signal from the accelerometer.

The system can further include a controller coupled to the Doppler radar unit and the wireless transceiver, the controller configured to process data from the Doppler radar unit and to provide the processed data to the wireless transceiver unit for transmission.

The system can further include a power cycling system coupled to the Doppler radar unit and the wireless transceiver and configured to cause the Doppler radar unit and the wireless transceiver to be selectively activated and deactivated.

The system can further include the exterior housing is configured to be attached to one or more pre-existing structural features of the vehicle.

The system can further include a speed detection system inside the vehicle.

The system can further include a speed detection system inside the vehicle that is configured to perform data processing on data received from the Doppler radar unit.

The system can further include the Doppler radar unit configured to generate blocks of radar data and the system inside the vehicle is a speed detection system and is configured to perform data processing on the blocks of data received from the Doppler radar unit to determine a vehicle speed.

A method for detecting a vehicle speed is disclosed that includes activating a Doppler radar unit contained within an exterior housing of a vehicle, detecting a relative speed of a road surface using the Doppler radar unit and transmitting data representing the relative speed of the road surface to a system inside of the vehicle that includes a display using a wireless transceiver contained within the exterior housing and coupled to the Doppler radar unit.

The method can further include activating the Doppler radar unit and the wireless transceiver in response to a signal received from an accelerometer coupled to the Doppler radar unit and the wireless transceiver.

The method can further include power cycling the Doppler radar unit.

The method can further include power cycling the Doppler radar unit and the wireless transceiver.

The method can further include power cycling the Doppler radar unit and the wireless transceiver in response to a signal from an accelerometer.

The method can further include processing data from the Doppler radar unit and at a controller and providing the processed data to the wireless transceiver unit for transmission.

The method can further include causing the Doppler radar unit and the wireless transceiver to be selectively activated and deactivated using a power cycling system.

The method can further include attaching the exterior housing to one or more pre-existing structural features of the vehicle.

The method can further include transmitting data representing the relative speed of the road surface to a speed detection system.

The method can further include transmitting data representing the relative speed of the road surface to a speed detection system and performing data processing on data received from the Doppler radar unit.

The method of claim 10 can further include generating blocks of radar data using the Doppler radar unit.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more micro-computers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for detecting a vehicle speed, comprising:
an exterior housing configured to be secured to an exterior surface of a vehicle;
a Doppler radar unit contained within the exterior housing and configured to detect a relative speed of a road surface;
a wireless transceiver contained within the exterior housing and coupled to the Doppler radar unit, the wireless transceiver configured to transmit data representing the relative speed of the road surface to a system inside of the vehicle that includes a display; and
an accelerometer coupled to the Doppler radar unit and configured to cause the Doppler radar unit to be activated for a predetermined period of time.

2. The system of claim 1 further comprising:
an accelerometer; and
a power cycling system coupled to the accelerometer, the Doppler radar unit and the wireless transceiver and configured to cause the Doppler radar unit and the wireless transceiver to be activated in response to a signal from the accelerometer.

3. The system of claim 1 further comprising a controller coupled to the Doppler radar unit and the wireless transceiver, the controller configured to process data from the Doppler radar unit and to provide the processed data to the wireless transceiver unit for transmission.

4. The system of claim 1 further comprising a power cycling system coupled to the Doppler radar unit and the wireless transceiver and configured to cause the Doppler radar unit and the wireless transceiver to be selectively activated and deactivated.

5. The system of claim 1 wherein the exterior housing is configured to be attached to one or more pre-existing structural features of the vehicle.

6. The system of claim 1 wherein the system inside the vehicle is a speed detection system and is configured to switch between two or more Doppler radar units, each contained in a separate exterior housing.

7. The system of claim 1 wherein the system inside the vehicle is a speed detection system and is configured to perform data processing on data received from the Doppler radar unit and is configured to detect an alert from the Doppler radar unit and to switch to a second Doppler radar unit contained in a separate exterior housing.

8. The system of claim 1 wherein the Doppler radar unit is configured to generate blocks of radar data and the system inside the vehicle is a speed detection system and is configured to perform data processing on the blocks of data received from the Doppler radar unit to determine a vehicle speed.

9. The system of claim 1 wherein the accelerometer is an accelerometer coupled to the Doppler radar unit and the wireless transceiver and is configured to cause the Doppler radar unit and the wireless transceiver to be activated for a predetermined period of time.

10. A method for detecting a vehicle speed, comprising:
    activating a Doppler radar unit contained within an exterior housing of a vehicle;
    detecting a relative speed of a road surface using the Doppler radar unit;
    transmitting data representing the relative speed of the road surface to a system inside of the vehicle that includes a display using a wireless transceiver contained within the exterior housing and coupled to the Doppler radar unit; and
    activating the Doppler radar unit for a predetermined period of time in response to a signal received from an accelerometer coupled to the Doppler radar unit.

11. The method of claim 10 further comprising power cycling the Doppler radar unit.

12. The method of claim 10 further comprising power cycling the Doppler radar unit and the wireless transceiver.

13. The method of claim 10 further comprising power cycling the Doppler radar unit and the wireless transceiver in response to a signal from an accelerometer.

14. The method of claim 10 further comprising processing data from the Doppler radar unit at a controller and providing the processed data to the wireless transceiver unit for transmission.

15. The method of claim 10 further comprising causing the Doppler radar unit and the wireless transceiver to be selectively activated and deactivated using a power cycling system.

16. The method of claim 10 further comprising attaching the exterior housing to one or more pre-existing structural features of the vehicle at a location remote from a vehicular noise source.

17. The method of claim 10 wherein transmitting data representing the relative speed of the road surface to the system inside of the vehicle comprises transmitting data representing the relative speed of the road surface to a speed detection system.

18. The method of claim 10 wherein transmitting data representing the relative speed of the road surface to the system inside of the vehicle comprises transmitting data representing the relative speed of the road surface to a speed detection system and performing data processing on data received from the Doppler radar unit.

19. The method of claim 10 further comprising generating blocks of radar data using the Doppler radar unit.

20. The method of claim 10 wherein the step of activating the Doppler radar unit comprises activating the Doppler radar unit and the wireless transceiver for a predetermined period of time in response to a signal received from an accelerometer coupled to the Doppler radar unit and the wireless transceiver.

\* \* \* \* \*